Patented July 28, 1942

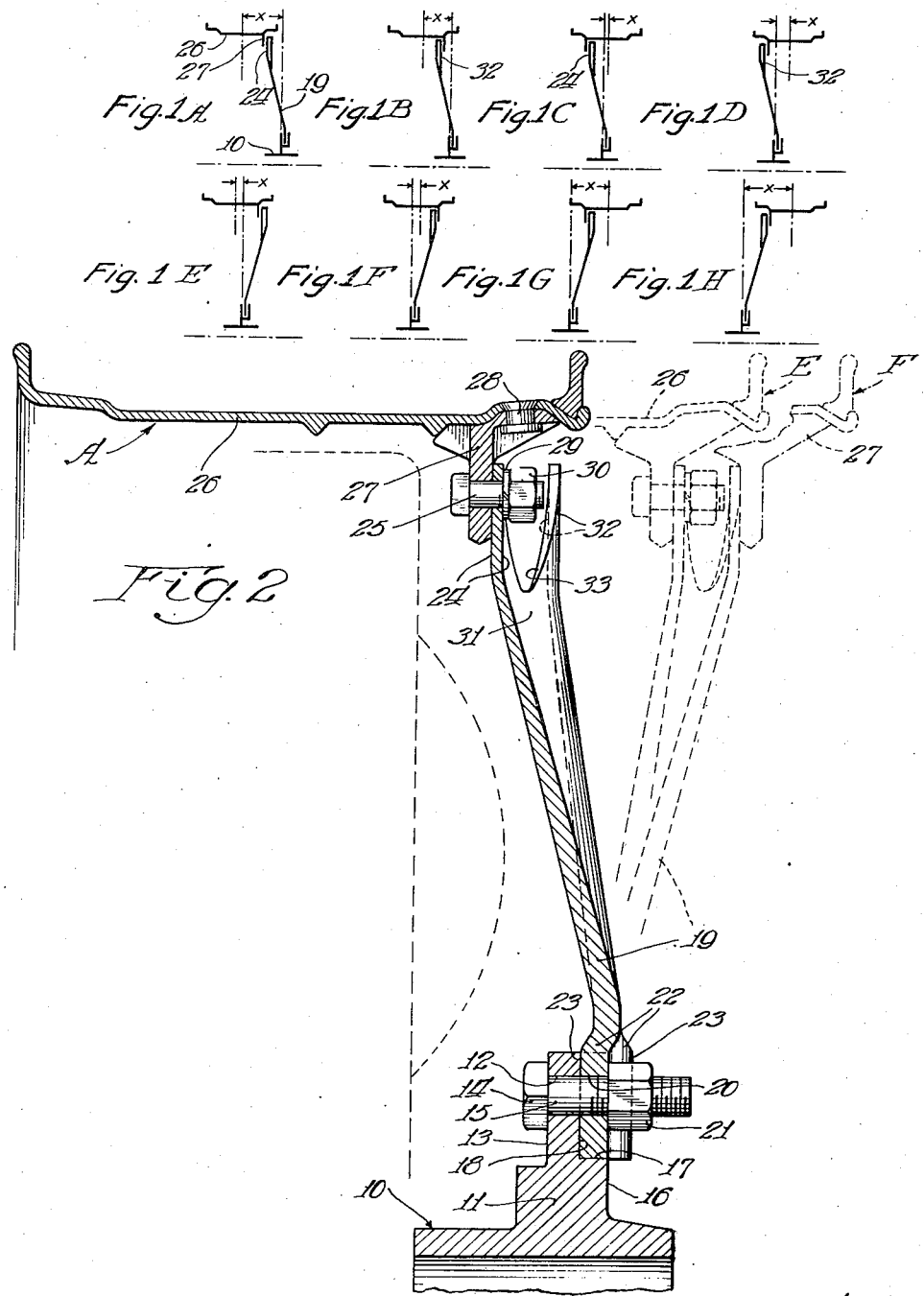

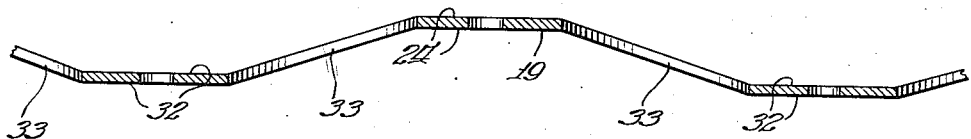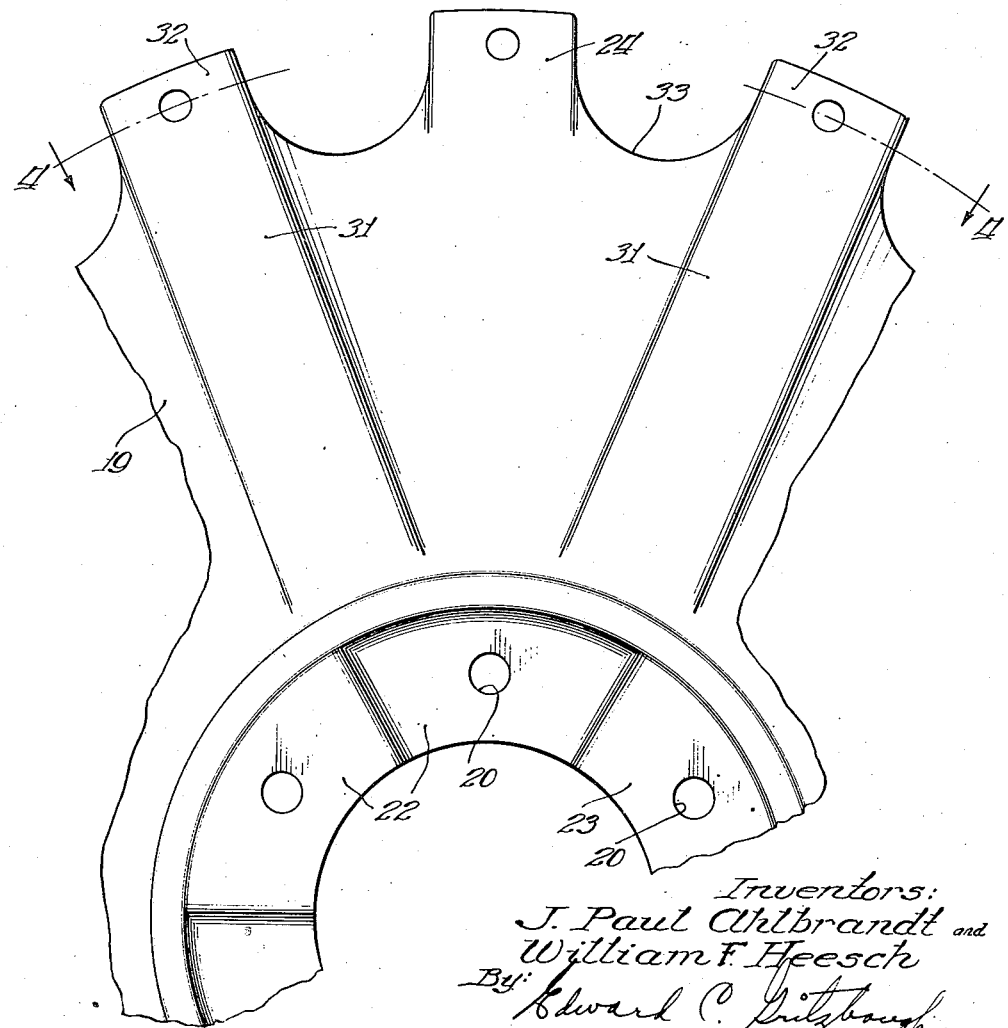

2,291,156

UNITED STATES PATENT OFFICE 2,291,156

WHEEL

William F. Heesch and John Paul Ahlbrandt, Chicago, Ill., assignors to Borg-Warner Corporation, Chicago, Ill., a corporation of Illinois Application December 6, 1937, Serial No. 178,241

2 Claims. (Cl. 301—9)

This invention relates to wheels and particularly to wheels with demountable rims.

Automotive vehicles used for special purposes such as tractors, carts or the like, are sometimes required to straddle rows or piles of products. Thus, tractors used on a farm are required to haul farm machinery over a field in which the plants are arranged in rows having a fairly constant spacing. It is imperative that the tread of the wheels of a tractor so used be such as to avoid rolling over the plants. The row spacings for various plants differ both in kind and geographically, however, and unless some means is provided to permit the tread to be altered in accordance with plant row spacings the tractor cannot be used universally without making major changes at the time of machine fabrication.

In factories, the completed or semi-completed parts may be arranged in piles which must be straddled, or the piles or machinery may be arranged with aisles therebetween of varying width, and it would be advantageous to provide trucks or carts with adjustable treads so that the same vehicle could be supplied to different factories, or to different departments of the same factory.

The object of this invention in its broadest aspect, therefore, is to provide a vehicle the tread of which may be adjusted as desired with the least amount of effort.

A more specific object of this invention is a wheel, the relative axial spacings of the rim and hub of which may be altered.

Another object is a wheel having a demountable rim and web, with a plurality of mounting means on the web whereby a variety of relative rim and hub spacings is possible.

These and other objects of this invention will become apparent from the following description when taken together with the accompanying drawings which form a part thereof and in which Figures 1A to 1H are schematic drawings of a wheel constructed in accordance with this invention and showing the possible variations in rim and web mountings to give eight different treads;

Fig. 2 is a detailed fragmentary elevation in section of a wheel incorporating this invention;

Fig. 3 is a fragmentary elevation of the wheel of Fig. 2; and

Fig. 4 is a section through the web of the wheel.

In its preferred form, this invention comprises forming a wheel in such a manner that the rim, web and hub are separable, and then forming the web with two or more sets of offset rim mountings, the web being cambered so that the hub and rim mountings are not axially aligned. The two rim mountings give two different treads; reversing the rim gives two more treads, and reversing the web gives four additional treads, yielding in all, eight different spacings. In addition, the hub and web connection is so formed as to give a small adjustment thereat, which doubles the number of spacings available.

Referring now to the drawings, there is shown at 10 in Fig. 2 a hub which is provided with a flange 11 having circumferentially spaced apertures 12. Flange 11 is recessed annularly at 13 to receive the heads 14 of bolts 15 which are threaded through apertures 12. The opposite side 16 of flange 11 is recessed annularly at intervals to form shoulders 17 and flat inner surfaces 18, the functions of which will be made clear hereinafter.

Positioned over bolts 15 is a web 19 which is provided for this purpose with apertures 20. Web 19 is secured to flange 11 by means of nuts 21. The inner portion of web 19 is provided with bosses 22 which are formed by alternately depressing and raising the normal surface of web 19. Any desired even number of bosses may be used, but in the form illustrated, six such bosses are shown. The bosses have flat surfaces 23 which are adapted to cooperate with flat surfaces 18 in the recesses in flange 11. At least one aperture 20 is provided for each boss.

It is apparent that rotating web 19 60° relative to hub 10 causes the bosses to cooperate with the portions of the flange intermediate the recesses, and hence constitutes a means for altering the relative axial spacing of the hub and web.

The outer periphery of web 19 is cambered and provided with a series of substantially parallel flat surfaces 24 which are apertured to receive bolts 25 whereby to secure a rim 26 to said web. Rim 26 may be of any standard form, the one chosen for illustration having lugs 27 secured by rivets 28 to one side thereof. It is understood that lugs 27 may likewise be of any form and may be detachable. Said lugs 27 extend radially inward from rim 26 and are apertured to receive and support the aforementioned bolts 25. A lock washer 29 and nut 30 serve to clamp the web and rim together to form a complete wheel.

In addition to flat surfaces 24, web 19 is embossed at predetermined intervals 31 or corrugated to provide a second series of substantially parallel flat surfaces 32 which are axially less removed from flange 11 than surfaces 24. The second series of flat surfaces is provided with apertures which correspond as to angular and radial spacing with the apertures in surfaces 24. Bolts 25 may therefore be threaded through either series of flat surfaces, whereby to provide two different axial spacings of rim 26 relative to hub 10.

To facilitate the transfer of lugs 27 from one series of flat surfaces to the other, the periphery of web 19 is notched at alternate intervals 33 between surfaces so that lugs 27 may be passed therethrough. Thus, to transfer lugs 27 from surfaces 24 to surfaces 32, web 19 is slipped off bolts 25, rotated in either direction relative to rim 26 until lugs 27 are aligned with notches 33, and then moved axially relative to rim 26 until lugs 27 are in the same plane as surfaces 32. Web 19 is next rotated relative to rim 26 until the apertures in lugs 27 are in line with the apertures in surfaces 32. Bolts 25 are then threaded through the aligned apertures and secured in place by lock washers 29 and nuts 30.

The possible combinations of web and rim positions are shown in Figures 1A to 1H. The position shown in Figure 1A is substantially the one shown in Fig. 2. The center of rim 26 is to the left of lugs 27; web 19 is turned so that the camber is toward the left, and lug 27 is secured to surfaces 24. In Figure 1B, the center of rim 26 is still to the left of lugs 27 and web 19 is also cambered to the left, but lugs 27 are secured to surfaces 32. In Figure 1C, rim 26 is reversed so that the center of the rim is to the right of lugs 27, and lugs 27 are secured to surfaces 24, web 19 still being cambered to the left. Figure 1D shows the rim still reversed but lugs 27 are secured to surfaces 32.

In Figures 1E to 1H inclusive, web 19 is reversed so that the camber is to the right. The center of rim 26 is to the left of lugs 27 in Figures 1E and 1F, and to the right of the lugs in Figures 1G and 1H. As in Figures 1A to 1D, lugs 27 are alternately secured to surfaces 24 and 32.

It is apparent that the axial distance between the hub and center of the rim is different in each position. By suitably proportioning the amount of camber, the axial distance between surfaces 24 and 32, and the position of lugs 27 relative to the center of the rim, the positions possible can yield spacings which differ from one another by equal amounts.

In addition to the spacings shown in Figures 1A to 1H the pads at the hub afford means for providing smaller variations in spacing. As an example of the various treads available by a pair of wheels embodying this invention, assuming a tread of 68 inches for Figure 1A, the treads for Figures 1B to 1H inclusive can be made 72, 80, 88, 76, 84, 92 and 96 inches respectively, and assuming a ¼ inch pad at the hub, these treads can be increased by ½ inch.

Thus, by the use of a web of the type described and a rim which is supported in off-center or cantilever position thereon, a wheel can be designed which permits the tread of the vehicle to be altered to suit particular requirements such as plant row spacings, etc. with a minimum of parts and effort. The cambered web and off-center rim permit the wheel to clear brake-drums or other parts of the vehicle.

It is understood that the foregoing is merely illustrative of a preferred embodiment of the invention, and that the scope of the invention, therefore, is not to be limited thereto, but is to be determined by the appended claims.

We claim:

1. In combination, a wheel hub, an annular rim supporting member having an inner portion reversibly mounted on said hub, the outer portion of said member being axially offset from said inner portion, and formed adjacent its outer periphery to define a plurality of axially spaced groups of attaching lugs, and a rim reversibly mountable on either side of each of said groups of lugs.

2. In combination, a wheel hub, an annular rim supporting web member having an inner portion reversibly mounted on said hub, the outer portion of said member being corrugated to define a plurality of groups of axially spaced portions, a rim having inwardly extending lugs and being reversibly mountable on either side of each of said groups of spaced portions, said groups of spaced portions constituting attaching lugs for attachment to said radially inwardly extending lugs on said rim, the outer periphery of said web member being further characterized by the fact that the same is notched between successive attaching lugs whereby to facilitate the connection of said rim to either side of said groups of lugs merely by turning said rim through a small number of degrees and shifting the same axially into engagement with the lugs of the respective group to which it is to be attached.

WILLIAM F. HEESCH.
JOHN PAUL AHLBRANDT.